United States Patent
Kronenberg et al.

(10) Patent No.: US 7,905,219 B2
(45) Date of Patent: Mar. 15, 2011

(54) METHOD AND APPARATUS FOR HEATING AT LEAST ONE INJECTOR OF AN ENGINE

(75) Inventors: Stephan Kronenberg, Wenzenbach (DE); Harry Schüle, Neunburg V. Wald (DE); Markus Ströhla, Wenzenbach (DE)

(73) Assignee: Continental Automotive GmbH, Hannover (DE)

( * ) Notice: Subject to any disclaimer, the term of this patent is extended or adjusted under 35 U.S.C. 154(b) by 289 days.

(21) Appl. No.: 12/196,222

(22) Filed: Aug. 21, 2008

(65) Prior Publication Data

US 2009/0055080 A1 Feb. 26, 2009

(30) Foreign Application Priority Data

Aug. 24, 2007 (DE) .......................... 10 2007 040 121
Sep. 18, 2007 (DE) .......................... 10 2007 044 400

(51) Int. Cl.
*F02G 5/00* (2006.01)
(52) U.S. Cl. ....................................... 123/549; 123/552
(58) Field of Classification Search .................. 123/549, 123/543, 552, 456
See application file for complete search history.

(56) References Cited

U.S. PATENT DOCUMENTS

| | | | | |
|---|---|---|---|---|
| 4,886,032 | A * | 12/1989 | Asmus | 123/557 |
| 5,755,211 | A | 5/1998 | Koch | 123/525 |
| 7,117,852 | B2 * | 10/2006 | Santero et al. | 123/490 |
| 7,444,230 | B2 * | 10/2008 | Cheiky | 701/106 |
| 7,481,376 | B2 * | 1/2009 | Hornby et al. | 239/5 |
| 7,516,733 | B2 * | 4/2009 | Stephan et al. | 123/445 |
| 7,669,585 | B2 * | 3/2010 | Haag et al. | 123/456 |
| 7,690,354 | B2 * | 4/2010 | Gale et al. | 123/446 |
| 7,743,754 | B2 * | 6/2010 | Cheiky | 123/549 |

FOREIGN PATENT DOCUMENTS

| | | |
|---|---|---|
| DE | 4329449 | 9/1993 |
| DE | 10146063 | 9/2001 |
| EP | 0718484 | 6/1996 |
| WO | 92/08888 | 5/1992 |

* cited by examiner

*Primary Examiner* — John T Kwon
(74) *Attorney, Agent, or Firm* — King & Spalding L.L.P.

(57) ABSTRACT

An apparatus and a method that prevent sticking of a valve pin in a valve seat of an injector at low temperatures can be provided providing an engine control unit and an additional control device, wherein the engine control unit activates the additional control device, and activate the injector by the additional control device in such a way that the injector by moving its valve pin is heated and/or rendered viable.

15 Claims, 2 Drawing Sheets

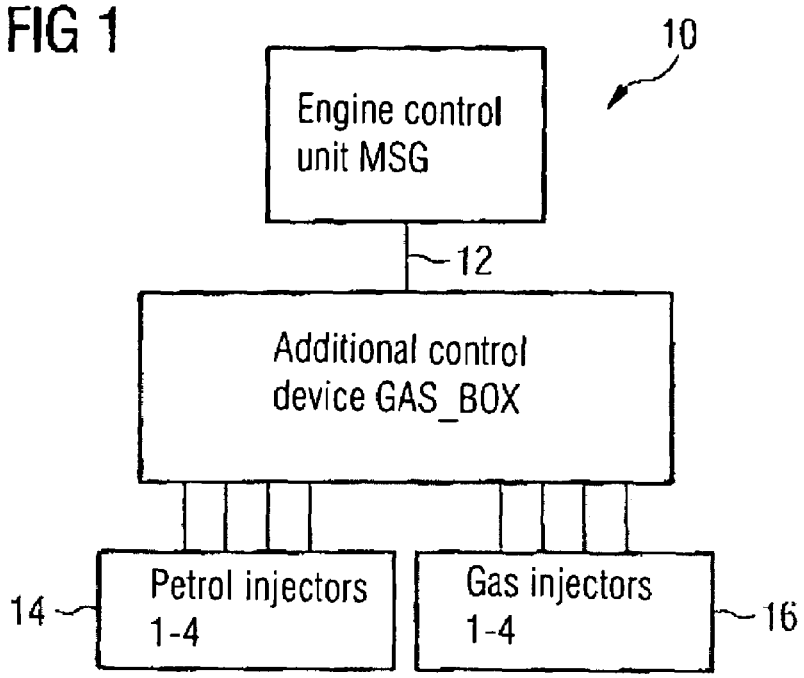
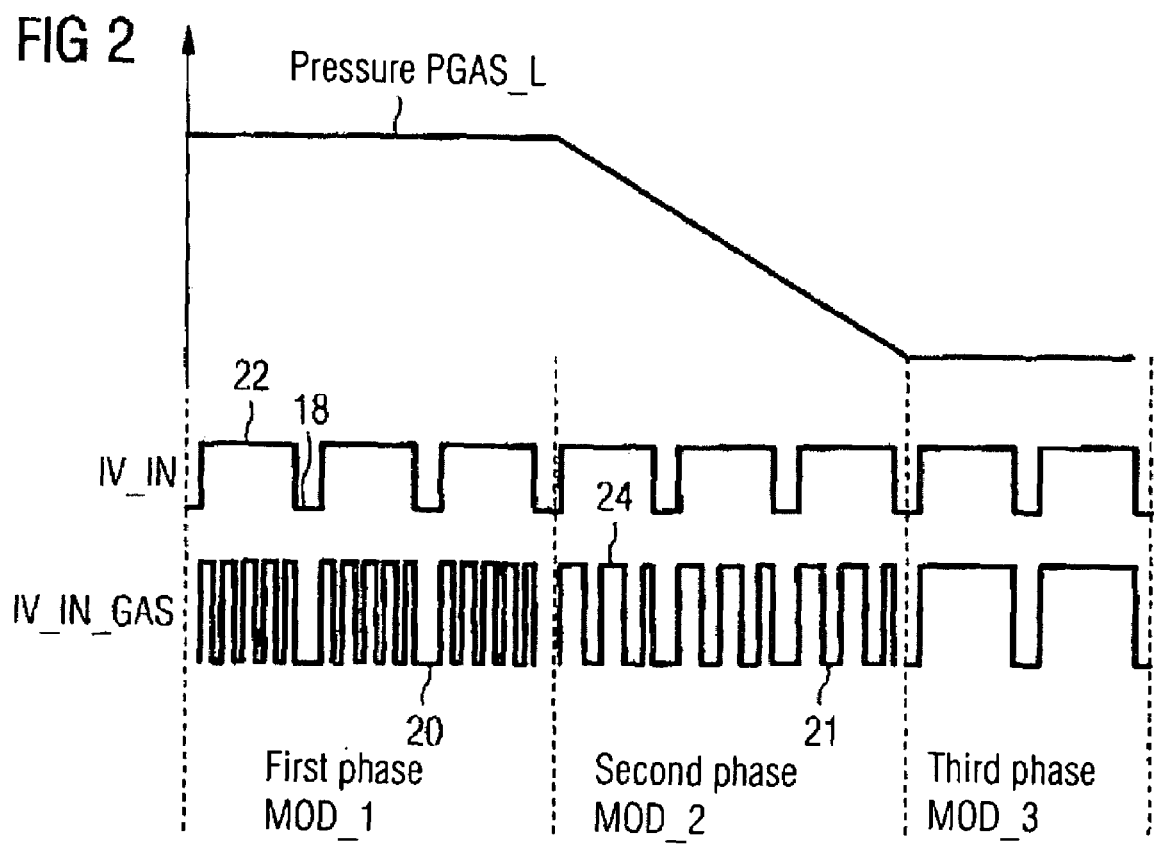

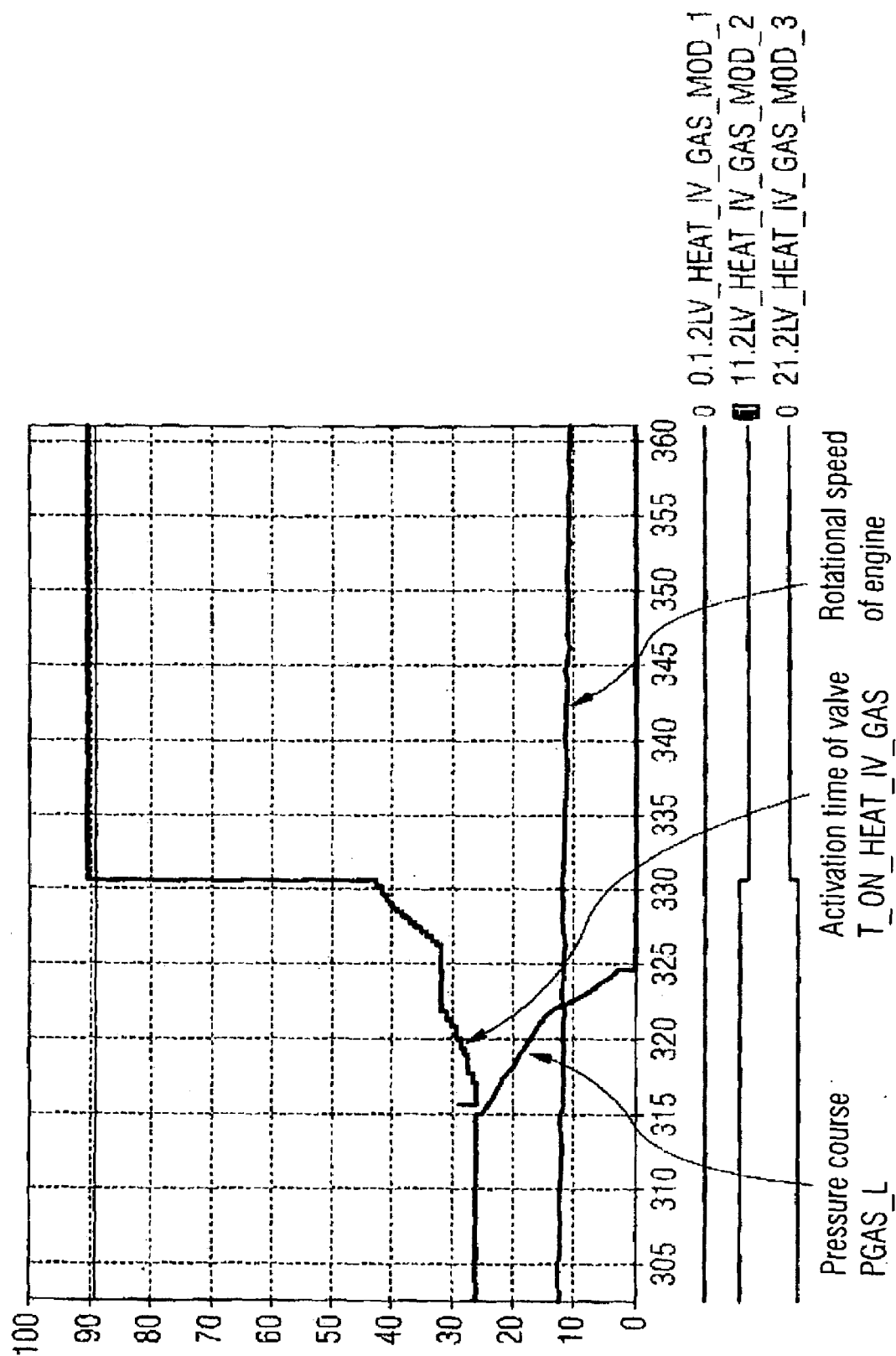

METHOD AND APPARATUS FOR HEATING AT LEAST ONE INJECTOR OF AN ENGINE

CROSS-REFERENCE TO RELATED APPLICATIONS

This application claims priority to German application number 10 2007 040 121.5 filed Aug. 24, 2007 and German application number 10 2007 044 400.3 filed Sep. 18, 2007, the contents of which are hereby incorporated by reference in their entirety.

TECHNICAL FIELD

The invention relates to a method and an apparatus for heating at least one injector, for example a gas injector of a motor vehicle.

BACKGROUND

Such gas injectors are used for example in combination with other fuel injectors, such as petrol injectors, with it being possible for a driver to switch for example between operating with gas and operating with the other fuel. In such vehicles this allows the fuel costs to be considerably reduced as running a petrol-driven vehicle currently costs an end consumer twice as much as a vehicle driven by a combination of gas, for example natural gas, and petrol.

In gas injectors of the type of prior art, the valve needle and the valve seat of a valve are manufactured from a material pairing metal/metal. This however has the drawback of not allowing such good sealing of the valve.

Alternatively, instead of the material pairing metal/metal, metal/nonmetal may now be used to form the valve. The nonmetal used for the valve seat in this case is an elastomer, for example hard rubber. The valve pin itself is still made of metal. Forming the valve seat from rubber has the advantage of allowing better sealing of the valve and/or injector than when, as in the prior art, the valve seat is manufactured from a metal. The pairing metal/rubber does however have the drawback that in cold ambient conditions, for example even at just below 0° C., a "sticking" or "seizing" of the valve needle in the rubber valve seat may occur. In these conditions therefore, in order to compensate this drawback the gas injector has to be heated. Without such a valve heating function the gas injectors having a valve seat made of rubber are incapable of operating at temperatures below zero, this leading to an unacceptable disadvantage for customers.

SUMMARY

A method and an apparatus can be provided that prevent a valve pin from sticking in a valve seat of an injector at low temperatures.

According to an embodiment, A method of heating at least one injector, for example a gas injector, of an engine may comprise the steps: a) providing an engine control unit and an additional control device, wherein the engine control unit activates the additional control device, and b) activating the injector by means of the additional control device in such a way that the injector by moving its valve pin is heated or rendered viable. According to a further embodiment, the additional control may controls the injector in dependence upon a pulse profile of the engine control unit. According to a further embodiment, the injector may be for example a gas injector and wherein the additional control device by means of the pulse profile optionally activates at least one further injector for injecting fuel, wherein the further injector is for example a petrol injector. According to a further embodiment, the step b) may comprise the further steps: c) emptying a gas rail, which is connected to the injector, by activating the injector, wherein the length of the pulses for activating the injector are selected in such a way that the injector just opens, c) heating the injector once the rail is completely empty, wherein the length of the pulses for activating the injector are set as great as possible for example to maximum. According to a further embodiment, the heating of the injector can be terminated when for example the temperature in the rail reaches or exceeds a predetermined threshold value, at which the injector is warm enough for the valve pin to be freely movable in the injector. According to a further embodiment, the step b) optionally additionally may comprise a preparation step b1), wherein the preparation step b1) is carried out prior to emptying of the rail and wherein in the preparation step b1) the length of the pulses for activating the injector is selected in such a way that the injector does not open. According to a further embodiment, the engine control unit may activate the additional control device, for example via a CAN data link, so that the additional control device carries out the respective operating phase, such as for example the preparation phase, the emptying of the rail or the heating of the injector, wherein the additional control device determines the length of the pulses in the respective operating phase, preferably in real time. According to a further embodiment, the emptying of the rail can be effected in such a controlled manner that the running behavior of the engine is not influenced. According to a further embodiment, injector heating may occur if it is established that for example the temperature of the rail or of the injector lies below a threshold value, from when a sticking of the valve pin in a valve seat of the injector arises.

According to a further embodiment, an apparatus for heating at least one injector, for example a gas injector, of an engine, may comprise an engine control unit and an additional control device, wherein the additional control device activates the injector in dependence upon a pulse profile of the engine control unit in such a way that the injector by moving its valve pin is heated or rendered viable.

According to a further embodiment, the additional control device for activating the injector suitably may adapt the pulse profile of the engine control unit in operating phases, wherein one operating phase comprises an emptying of a rail that is connected to the injector, wherein the additional control device adapts the length of the pulses for activating the injector in such a way that the injector just opens, and wherein in one operating phase of the injector heating the additional control device, increases the length of the pulses in such a way that a suitable or maximum heating capacity is achievable. According to a further embodiment, the additional control device optionally may have an additional preparation phase as an operating phase, in which pulses for activating the injector are selected in the additional control device in such a way that the injector does not open. According to a further embodiment, the injector is for example a gas injector and wherein the additional control device optionally activates at least one further injector for injecting fuel, wherein the further injector is for example a petrol injector. According to a further embodiment, the additional control device may be provided for example as an "add-on" part on the engine control unit, for example via a data link, such as a CAN data link, wherein the engine control unit activates the additional control device so that the additional control device carries out the respective operating phase, such as the preparation phase, the emptying of the rail and/or the heating of the injector, wherein the additional control device determines the length of the pulses in the respective operating phase, preferably in real time.

According to yet another embodiment, an engine may comprise at least one injector, for example a gas injector, an apparatus as described above, wherein the injector may comprise a valve seat, for example made of a nonmetal, such as for example an elastomer, for example rubber, as well as a valve pin for example made of a metal.

BRIEF DESCRIPTION OF THE DRAWINGS

There now follows a detailed description of various forms of implementation of the invention with reference to the accompanying drawings. The drawings show in:

FIG. 1 a diagram illustrating the structure of the control apparatus according to an embodiment, FIG. 2 a diagram illustrating three phases MOD_1 to MOD_3 for heating an injector according to an embodiment, and FIG. 3 a diagram showing an example of the profile of the heating of a gas injector in accordance with the second phase MOD_2.

DETAILED DESCRIPTION

According to various embodiments, an engine control unit and an additional control device are provided, wherein the additional control device activates the injector in dependence upon a pulse profile of the engine control unit in such a way that a valve pin of the injector by moving within its valve seat is prevented from as-it-were sticking and seizing there.

This may have the advantage of allowing the use of for example an injector that has a valve seat made of a nonmetal, such as for example rubber. As already described above, these injectors may have the advantage of possessing better sealing properties than injectors with a metal/metal pairing. In this way it may moreover be ensured that the valve pin cannot stick fast in the valve seat, especially at low temperatures, as the moving of the valve pin leads to a heating of the injector that prevents the valve pin from sticking to the valve seat. An added advantage may be that a conventional engine control unit may be used as the actual control of the injector is effected by means of the additional control device, which for this purpose uses the pulses from the engine control unit.

According to a further embodiment, the additional control device controls the injector in dependence upon a pulse profile of the engine control unit that is used for example to activate a further fuel injector. The injector is for example a gas injector, while the further injector is a different fuel injector, such as for example a petrol injector. By means of the pulse profile the engine control unit may then, on the one hand, instruct the additional control device to carry out the injection operation of the petrol injector and, on the other hand, prepare the gas injector in such a way that, upon a changeover to gas mode, the gas injector operates reliably without the valve pin sticking in the valve seat.

According to a further embodiment, in order to prepare the injector, first an emptying of a rail that is connected to the gas injector is effected. This ensures that there is no gas in the rail at the start of heating of the injector. To empty the rail, the length of the pulses for activating the injector is selected in such a way that the valve barely opens and/or opens for a short time. The length of the pulses in this case is for example gradually increased to a predetermined maximum value in this operating phase in order to avoid a sudden drop in pressure. Once the rail is finally empty, it is possible to start the actual heating operation, during which the valve pin is moved to the greatest extent to and fro and/or between an open and closed position. The length of the pulses may in this case be set for example to maximum, with it being possible in this operating phase to dispense with a gradual increase to this maximum value. This may have the advantage that, on the one hand, the gas injector may be prepared in such a way that it is reliably operable and, on the other hand, during the preparation the running behavior of the engine is not impaired, for example by a sudden steep pressure drop in the rail.

In another form of implementation, the heating of the injector is terminated if for example the temperature in the rail reaches or exceeds a predetermined threshold value, at which the injector is warm enough for the valve pin to be freely movable in the injector. This may have the advantage of making it possible to prevent an overheating of the injector or the rail.

According to a further embodiment, it is optionally possible additionally to provide a preparation step that is carried out before the operating phase of emptying the rail. In this preparation step the additional control device determines the length of the pulses for activating the injector in such a way that the injector does not open. In other words, the valve pin is hardly moved or is not moved at all. In this case, by means of the electric voltage realized by the pulses an initial slight preheating of the injector may be produced without the injector for this purpose having to be moved between an open and closed position.

According to a further embodiment, the engine control unit activates the additional control device, for example via a CAN data link, so that the additional control device carries out the respective operating phases for heating the injector. The additional control device calculates and/or determines the activation times of the injector in the respective operating phase. This may have the advantage that operations, such as the execution of the operating phases, may be carried out in real time by the additional control device, while other operations that do not necessarily have to be executed in real time, such as activating the respective operating phase, may be carried out by the engine control unit. This allows the system comprising engine control unit and additional control device to be of a simpler and more economical design.

According to a further embodiment, the emptying of the rail is effected in such a gentle and/or controlled manner that the running behavior of the engine is not influenced. In particular, by virtue of gradually increasing the pulse length to a maximum value in this operating phase a rapid pressure drop and a resultant unintentional rotational speed change may be reliably prevented.

According to a further embodiment, the heating of the injector occurs if it is established that for example the temperature of the rail, the temperature of the injector or an ambient temperature lies below a threshold value, the threshold value in the case of the ambient temperature being for example ca. 0° C. This may have the advantage that the heating function of the injector is executed only in critical ranges and it is moreover possible to fall back on values that have already been determined for other applications in the engine control unit.

First, in FIG. 1 a highly simplified diagram is represented, which shows the structure according to an embodiment of a control apparatus 10 for heating gas injectors of a vehicle engine. The apparatus 10 in this case comprises an engine control unit MSG of the type conventionally used in motor vehicles. In addition to this engine control unit MSG, according to an embodiment an additional control device GAS_BOX is provided. This is connected to the engine control unit MSG for example by a CAN data line 12. The additional control device GAS_BOX is used to activate the petrol- and gas injectors in dependence upon the engine control unit MSG.

Compared to a solution, in which the engine control unit directly activates the petrol- and gas injectors, the additional control device GAS_BOX may have the advantage that it may simply be connected as an add-on part to the engine control unit used in the vehicles. In a solution, in which the engine control unit directly activates the injectors, on the other hand, it is not possible to use the engine control unit provided in the vehicle, rather it is necessary to provide an engine control unit specially designed for this purpose of directly activating the petrol- and gas injectors and realizing a heating function in the case of the gas injectors. Retrofitting a vehicle, therefore, entails a complete exchange of the engine control unit, whereas it may be retained in the form of implementation according to an embodiment.

According to an embodiment the additional control device GAS_BOX is connected to at least one petrol injector 14 and one gas injector 16 or, as is shown in FIG. 1, to for example four petrol- and four gas injectors 14, 16. The engine control unit MSG transmits the control pulses IV_IN for activating the petrol- and gas injectors 14, 16 to the additional control device GAS_BOX. Via the CAN data link 12 i.a. the modes MOD_1-3 to be executed are communicated to the GAS_BOX.

In the present system it is possible to switch back and forth between a petrol mode and a gas mode. Since in the present case according to an embodiment a system structure for example in the form of a master (engine control unit MSG)/ slave (additional control device GAS_BOX) concept is used, for the gas valve heating function the engine runs in petrol mode because the additional control device GAS_BOX for safety reasons preferably executes no independent injections without these being transmitted by the engine control unit MSG. The injector heating function is achieved in this case by the moving and/or opening and closing of the gas injector, but without the simultaneous injection of relevant gas quantities. In this case, a low-pressure shut-off valve disposed upstream of a gas rail (not illustrated) may be provided, which remains closed during the heating function to prevent a follow-up flow of gas from a pressure reducer.

When the vehicle is in petrol mode, the petrol injectors are activated by means of the additional control device GAS_BOX. The additional control device GAS_BOX in this case transmits for example signals and/or a pulse profile IV_IN of the engine control unit MSG substantially unaltered as signals IV_OUT_petrol to the petrol injectors. In petrol mode the gas injectors are simultaneously prepared and/or heated so that upon a changeover from petrol mode to gas mode the gas injectors operate reliably. This means that it is ensured that a valve pin of the respective gas injector cannot "stick" to the valve seat.

For this purpose, the additional control device GAS_BOX varies and/or adapts the signals and/or the pulse profile IV_IN of the engine control unit MSG in an appropriate manner in order to prevent a "sticking" of the valve pin to the valve seat, in particular at low temperatures. The adaptation of the pulse profile IV_OUT_GAS in this case is effected for example in three phases MOD_1 to MOD_3. In the first phase MOD_1 the gas injector is activated without this leading for example to an actual opening of the gas injector. In the second phase MOD_2 a metered emptying of the blocked gas rail occurs through the gas injectors into an intake manifold. In this case, the pressure PGAS_L in the gas rail is reduced.

There now follows a detailed description with reference to FIG.2 of the heating of the gas injectors in the three phases MOD_1 to MOD_3. FIG. 2 shows a diagram illustrating the three phases MOD_1 to MOD_3 of the control of a valve pin according to an embodiment in order reliably to prevent a "sticking" of the valve pin for example to a non-metal valve seat, in particular at low ambient temperatures of below 0° C.

The diagram shows the pulse profile IV_IN as it is transmitted from the engine control unit MSG to the additional control device GAS_BOX. In the additional control device GAS_BOX the pulse profile IV_IN is for example accepted unaltered and by means of the selected pulse profile IV_OUT_PETROL the petrol injectors are activated.

Further represented is a pulse profile IV_OUT_GAS, with which the additional control device GAS_BOX activates the gas injectors in such a way that their valve pins are prevented from "sticking" or "seizing" on the respective valve seat.

The additional control device GAS_BOX for this purpose suitably varies the pulse profile IV_OUT_GAS in order to activate the gas injectors in such a way that they are warmed and/or heated. The pulse profiles in this case are split into the phases MOD_1 to MOD_3. In other words, the pulse profile IV_OUT_GAS of the gas injectors is coupled to the pulse profile IV_IN of the engine control unit MSG and/or to the pulse profile of the petrol injectors. This means i.a. that the low phases 18 of the pulses of the engine control unit MSG in a system-dependent manner match the low phases 20, 21 of the pulses for activating the gas injectors.

In order then to move the valve pin in a suitable manner so that it cannot "stick" in the valve seat, the first phase MOD_1 is first executed. In this case, the performance quantity LV_HEAT_GAS_IV_MOD_1 is set to =1, i.e. the first phase MOD_1 is activated, and is output by the engine control unit MSG via the CAN data link to the additional control device GAS_BOX, so that the latter starts the first phase MOD_1.

In the first phase MOD_1 the gas injector is activated by means of pulses of the additional control device GAS_BOX, wherein the lengths of the high phases 24 of the pulses of the pulse profile IV_OUT_GAS are so selected by the additional control device GAS_BOX that the valve pin either does not move at all, so that only an electric voltage is applied to it, or moves only very slightly. In the latter case, the valve pin is moved only to the extent that it is still ensured that the injector is not opened and so no gas may escape from the gas injector. In other words, in the first phase MOD_1 the activation time and/or clock time T_ON_HEAT_GAS_IV of the gas injectors is so low that the gas injectors inclusive of all tolerances do not open. This means that the activation time T_ON_HEAT_GAS_IV is for example lower than a battery voltage correction value TI_ADD_DLY_GAS (base point) for the gas injector. The "non"-activation times T_OFF_HEAT_GAS_IV are in this case applied in such a way that, in the event of an opened gas valve or gas injector, it may reliably close until the next activation time T_ON_HEAT_GAS_IV is transmitted. The pressure PGAS_L in the gas rail indicated in FIG. 2 is therefore substantially constant in the first phase MOD_1 because no pressure release occurs in the gas rail.

The second phase MOD_2 is then utilized to empty the connected gas rail in a gentle and/or controlled manner and in so doing correspondingly gradually release the pressure PGAS_L in the gas rail. The gas rail in this case is emptied through one or more gas injectors or valves in such a controlled manner that the operation of the vehicle is substantially not negatively influenced.

To start the second phase MOD_2 the engine control unit MSG sets the performance quantity LV_HEAT_GAS_IV_MOD_2 to =1, i.e. the second phase MOD_2 is activated. The engine control unit MSG relays this via the CAN data link 12 to the additional control device GAS_BOX and prompts the latter to start the second phase MOD_2.

In the second phase MOD_2, as is shown in FIG. 2, the length and/or the high phase 24 of the pulses of the gas injector is increased. The length of the pulses in this case is so selected that the valve pin is moved to and fro to a greater extent than in the first phase MOD_1. More precisely, the valve pin is moved to and fro by the pulses to such an extent that the injector repeatedly opens slightly for a short time, thereby allowing a controlled release of pressure from the gas rail. The maximum activation time T_ON_HEAT_GAS_IV_MOD_2_MAX of the second phase MOD_2 in the present case is determined and/or applied in such a way that the injectors and/or valves inclusive of all tolerances for example barely open or open slightly. As FIG. 2 reveals, the pressure PGAS_L therefore gradually decreases in the gas rail. The result is therefore a "finely" metered emptying of the blocked gas rail through the gas injector for example into an intake manifold of the engine.

Upon entry into the second phase MOD_2, for example all variables are initialized with the values from the first phase MOD_1. Then the activation time T_ON_HEAT_GAS_IV is slowly incremented, i.e. increased, until either the maximum value T_ON_HEAT_GAS_IV_MOD_2_MAX of the second phase MOD_2 is reached or the rail pressure PGAS_L of the gas rail reaches or falls below a threshold value.

If during this process too steep a pressure drop occurs in the gas rail, it may happen that faults arise because of the pressure reduction. In the event of too steep a pressure drop, too large a quantity of gas may be discharged through the gas injector, thereby resulting in too rich a gas mixture and hence no suitable combustion because not all of the gas may be adequately burnt. This would also make itself felt in a correspondingly irregular running of the engine.

If it is therefore established that the pressure drop in the gas rail is too great, then a re-initialization is carried out. This means that the activation time in the second phase MOD_2 for example starts once more with the parameters and/or activation times of the first phase MOD_1 and is slowly incremented. As already described above, the activation times in the first phase MOD_1 are designed in such a way that the valve pin is either not moved at all or is barely moved, so that the injector in any case does not open. From these activation times the second phase MOD_2 in this case inches its way back up by increasing the activation times and/or the length of the pulses until the maximum activation time T_ON_HEAT_GAS_IV_MOD_2_MAX of the second phase MOD_2 is reached or the rail pressure PGAS_L of the gas rail finally reaches a threshold value of for example 0 bar. This new incrementing phase may begin for example after a predetermined delay time C_TDLY_HEAT_GAS_IV_INC_STOP. In this case, after each increment step a delay time C_TDLY_HEAT_GAS_IV_INC may also optionally or additionally be provided for waiting till the system responds.

When the rail pressure PGAS_L of the gas rail finally reaches the threshold value of for example 0 bar, then after the applied time a changeover into the third phase MOD_3 may occur. To start the third phase MOD_3 the engine control unit MSG sets the performance quantity LV_HEAT_GAS_IV_MOD_3 to =1, i.e. the third phase MOD_3 is activated. The engine control unit MSG relays this in a corresponding manner via the CAN data link 12 to the additional control device GAS_BOX and prompts the latter to start the third phase MOD_3.

In the third phase MOD_3 the length of the pulses is once more increased in order to move the valve pin to and fro to an even greater extent. The length of the pulses in this case may be maximized so that the length of the pulses for controlling the gas injector corresponds substantially 1:1 to the pulses for controlling the petrol injector. Since the gas rail was emptied in the preceding second phase MOD_2, the pressure PGAS_L in the gas rail is still constant and/or 0 bar, as is shown in FIG. 2. In the third phase MOD_3, as the actual heating phase, the valve is warmed or heated up by the generated movement of the valve pin, so that even at low temperatures the valve pin cannot stick to the rubber valve seat, a reliable mode of operation of the gas injector instead being guaranteed. In other words, the third phase MOD_3 produces the greatest heating capacity, while the phases MOD_1 and MOD_2 are preliminary phases.

In the third phase MOD_3 the activation time T_ON_HEAT_GAS_IV is for example at its maximum, i.e. it corresponds substantially to the activation time of the petrol injectors. In other words, the length of the high phases 24 of the pulses for the gas injectors is in this case equal to the length of the high phases 22 of the pulse profile IV_IN of the engine control unit MSG and/or the petrol injectors. The "non"-activation times in the third phase MOD_3 may be set for example to =0. This means that in the high phases 24 no additional low phases 21 are inserted in between, as they are in the first and second phases MOD_1 and MOD_2. In this way, a maximum heating capacity is provided.

The duration of the entire activation per injection pulse may be limited by a maximum time C_T_MAX_HEAT_IV_GAS_MOD_3. The time C_T_MAX_HEAT_IV_GAS_MOD_3 in this case represents the maximum duration of a pseudo PWM signal within the injection time TI_PETROL_TIME of the petrol injectors in order to limit the heating capacity in the event of very high loads.

As already described above, the heating function of the gas injector is realized by means of a master/slave concept comprising the engine control unit MSG and the additional control device GAS_BOX. In principle, the described activation of the gas injector may also be calculated entirely by means of the additional control device GAS_BOX or the engine control unit MSG. The advantage of splitting the calculation is however that less quantities have to be communicated via the CAN data link 12 and moreover that the time-critical signals may be evaluated at the most advantageous location in each case. In other words, the additional control device GAS_BOX for example carries out calculations and/or operations that are to be carried out in real time, while the engine control unit MSG carries out calculations and/or operations that do not necessarily have to be carried out in real time.

The additional control device GAS_BOX therefore carries out for example the calculation and/or distribution of the pulses for activating the gas injectors in accordance with the previously described three phases MOD_1 to MOD_3, as well as the activation of the petrol injectors. The engine control unit MSG, on the other hand, specifies for example when and which of the three phases MOD_1 to MOD_3 is started by the additional control device GAS_BOX. In this case, for example the following quantities are transmitted via the CAN data link 12 from the engine control unit MSG to the GAS_BOX. First of all, the quantities LV_HEAT_GAS_IV_MOD_1-3, which indicate that the respective phase MOD_1, MOD_2 or MOD_3 is active. Furthermore, the quantity TI_ADD_DLY_GAS is transmitted, which indicates a battery voltage correction for the GAS injectors (base points). The following are further transmitted:

LV_HEAT_GAS_IV_MOD_1—heating with a parameter set 1, in which case the activation time of the gas injector TI_GAS_times<a battery voltage correction value TI_ADD_DLY_GAS (base point) for the gas injector is executed, thereby ensuring that no valve opening occurs LV_HEAT_GAS_IV_MOD_2—heating with a parameter set 2, in which case the activation time of the gas injector TI_GAS_times>or just above a battery correction value TI_ADD_DLY_GAS (base point) for the gas injector is executed, thereby ensuring that there is just a valve opening at the end of the second phase MOD_2

LV_HEAT_GAS_IV_MOD_3—heating with a parameter set 3, wherein the maximum value for the activation time of the gas injector TI_GAS_times applies in order to achieve a maximum heating capacity.

These parameter sets 1 to 3 contain for example i.a. the following quantities:

suitable characteristic maps (IP_X) for the activation times of the valve of the gas injector IP_T_ON_HEAT_GAS_IV_MOD_x in order to determine from these the high phase 24 of the activation time TI_GAS of the gas injector. Moreover, suitable characteristic maps (IP_X) for the non-activation times 25 of the valve of the gas injector IP_T_OFF_GAS_IV_MOD_x in order to determine from these the low phase 20, 21 of the TI_GAS activation for the three phases (x=1 to 3).

The decision, whether injector heating is necessary, is taken for example on the basis of the gas rail temperature TGAS_L. Above an applicable threshold the gas injector is identified as "warm" and the gas mode in this respect is enabled. If injector heating is necessary, the three phases MOD_1 to MOD_3 with applicable durations are executed and under normal conditions terminated with the status "heated". After the gas injector has been heated, a changeover to the gas mode has to be effected without delay to avoid renewed "sticking" of the gas injector. The same applies to an overrun fuel cutoff phase, in which the driver releases the accelerator. If these phases at low temperatures are longer than a predetermined and/or applied time, then the function changes to a "reset" state, in which the operating mode is switched back to petrol in order to initiate a fresh injector heating cycle. In this case, it should be noted that it is in principle also possible to omit the first phase MOD_1 and carry out only the second and third phases MOD_2 and MOD_3.

In FIG. 3 a diagram is represented, which shows an example of the characteristic of the heating of a gas injector in accordance with an embodiment. Here, the second phase MOD_2, in which a pressure release of the gas rail occurs, is represented. This diagram shows, on the one hand, the reduction of the pressure PGAS_L and at the same time the characteristic of the rotational speed of the engine and the characteristic of the activation time of the valve T_ON_HEAT_IV_GAS (24) of the gas injector. As may be gathered from the diagram, the activation time of the valve T_ON_HEAT_IV_GAS of the gas injector is slowly incremented until the activation time either reaches a maximum value TI_ON_HEAT_GAS_IV_MOD_2_MAX of the second phase MOD_2 or the rail pressure PGAS_L of the gas rail, as is shown here, reaches a threshold value of 0 bar. In this case, it may be gathered from the diagram that the injector may be activated in such a controlled manner that an optimum pressure reduction in the gas rail may be achieved, during which the rotational speed of the engine is not negatively influenced. In other words, too steep a pressure drop and hence for example the production of too rich a gas mixture may be avoided in the second phase MOD_2 by means of a suitable, controlled activation of the injector. The inflected pressure gradient of the pressure PGAS_L in this case is the result of the opening of a further injector.

The present invention has been described with reference to an engine with petrol- and gas injectors. The invention is however not limited to petrol injectors. It is in principle also possible to use, instead of petrol injectors, any other type of fuel injectors, such as for example diesel injectors, to name but one example.

LIST OF REFERENCE CHARACTERS 10 control apparatus
12 CAN data link
14 petrol injector
16 gas injector
18 low phase (engine control unit)
20 low phase (gas injector)
21 additional low phase (gas injector)
22 high phase (engine control unit)
24 high phase (gas injector)

What is claimed is:

1. A method of heating at least one injector of an engine comprising the steps:
    providing an engine control unit and an additional control device coupled between the engine control unit and the at least one injector and configured to control the operation of the at least one injector;
    the additional control device receiving an input pulse profile from the engine control unit;
    the additional control device adapting the received input pulse profile to generate output signals for activating the at least one injector in such a way that the at least one injector is heated, including:
        generating a first output pulse profile for activating the at least one injector during a first phase to empty a gas rail, which is connected to the at least one injector, the first output pulse profile defining a number of first electrical pulses, each first electrical pulse having a first pulse time period configured to activate the at least one injector to open the at least one injector a first amount, such that the first output pulse profile provides a metered emptying of the gas rail, and
        generating a second output pulse profile for activating the at least one injector, after the gas rail is emptied by application of the first output pulse profile, to heat the at least one injector during a second phase, the second output pulse profile defining a number of second electrical pulses, each second electrical pulse having a second pulse time period longer than the first pulse time period, to open the at least one injector a second amount greater than the first amount.

2. The method according to claim 1, wherein the at least one injector is a gas injector and wherein the additional control device by means of the first and second pulse profiles optionally activates at least one further injector for injecting fuel, wherein the further injector is a petrol injector.

3. The method according to claim 1, wherein the second pulse time period is set as great as possible or to maximum.

4. The method according to claim 3, wherein the heating of the injector is terminated when the temperature in the gas rail reaches or exceeds a predetermined threshold value.

5. The method according to claim 3, wherein the emptying of the gas rail is effected in such a controlled manner that the running behavior of the engine is not influenced.

6. The method according to claim 1, further comprising a preparation step prior to emptying of the gas rail, wherein in the preparation step electrical pulses for activating the at least one injector have a time period selected in such a way that the time period injector does not open.

7. The method according to claim 1 wherein the additional control device determines the first pulse time period and the second pulse time period during the respective first or second phase.

8. The method according to claim 7, wherein the engine control unit communicates with the additional control device via a CAN data link.

9. The method according to claim 7, wherein the additional control device determines the first pulse time period and the second pulse time period in real time.

10. The method according to claim 1, wherein injector heating occurs if it is established that the temperature of the gas rail or of the injector lies below a predetermined threshold value.

11. The method according to claim 1, wherein the at least one injector comprises at least one gas injector.

12. An apparatus for heating at least one injector of an engine, wherein the apparatus comprises:
   at least one injector;
   an engine control unit;
   an addition al control device coupled between the engine control unit and the at least one injector and configured to control the operation of the at least one injector, the additional control device configured to:
      receive input pulse profiles from the engine control unit;
      adapt the received input pulse profiles to generate output signals for activating the at least one injector to heat the at least one injector, including:
         generating a first output pulse profile during a first phase to empty a gas rail connected to the at least one injector, the first output pulse profile defining a number of first electrical pulses, each having a first pulse time period configured to open the at least one injector a first amount, such that the first output pulse profile provides a metered emptying of the gas rail, and
         generating a second output pulse profile for activating the at least one injector to heat the at least one injector during a second phase, the second output pulse profile defining a number of second electrical pulses, each having a second pulse time period longer than the first pulse time period.

13. The apparatus according to claim 12, wherein the additional control device has an additional preparation phase prior to the first phase, in which time periods for electrical pulses for activating the at least one injector are selected by the additional control device in such a way that the at least one injector does not open.

14. The apparatus according to claim 13, wherein the additional control device determines the first pulse time period and the second pulse time period during the respective first or second phase.

15. The apparatus according to claim 12, wherein the at least one injector is a gas injector and wherein the additional control device also activates at least one further injector for injecting fuel, wherein the further injector is a petrol injector.

* * * * *